United States Patent
Seo et al.

(10) Patent No.: US 8,315,146 B2
(45) Date of Patent: Nov. 20, 2012

(54) ADAPTIVE WRITING METHOD FOR HIGH-DENSITY OPTICAL RECORDING APPARATUS AND CIRCUIT THEREOF

(75) Inventors: Jin-gyo Seo, Seoul (KR); Seong-sin Joo, Suwon-si (KR); Du-seop Yoon, Suwon-si (KR); Myung-do Roh, Suwon-si (KR); Yong-jin Ahn, Seoul (KR); Seoung-soo Kim, Seoul (KR); Kyung-geun Lee, Sungnam-si (KR); Myeong-ho Cho, Seoul (KR); Chang-Jin Yang, Suwon-si (KR); Jong-kyu Kim, Suwon-si (KR); Sung-ro Ko, Gunpo-si (KR); Tatsuhiro Ohtsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/107,240

(22) Filed: May 13, 2011

(65) Prior Publication Data

US 2011/0286318 A1 Nov. 24, 2011

Related U.S. Application Data

(60) Continuation of application No. 12/122,912, filed on May 19, 2008, now Pat. No. 7,986,610, which is a continuation of application No. 11/432,473, filed on May 12, 2006, now Pat. No. 7,391,698, which is a continuation of application No. 10/774,404, filed on Feb. 10, 2004, now Pat. No. 7,209,423, which is a continuation of application No. 09/609,822, filed on Jul. 3, 2000, now Pat. No. 7,158,461, which is a division of application No. 09/359,128, filed on Jul. 23, 1999, now Pat. No. 6,631,110.

(30) Foreign Application Priority Data

Jul. 23, 1998 (KR) .......................... 10-1998-0029732

(51) Int. Cl.
*G11B 7/24* (2006.01)
*G11B 7/00* (2006.01)

(52) U.S. Cl. ............... 369/275.3; 369/59.12; 369/59.11; 369/53.2; 369/53.22

(58) Field of Classification Search .................... None
See application file for complete search history.

(56) References Cited

U.S. PATENT DOCUMENTS 4,423,502 A 12/1983 Dil
(Continued)

FOREIGN PATENT DOCUMENTS

EP 0388897 9/1990
(Continued)

OTHER PUBLICATIONS

Office Action issued in Chinese Patent Application No. 99111676.3 on Jun. 20, 2003.

(Continued)

*Primary Examiner* — Muhammad N Edun
(74) *Attorney, Agent, or Firm* — NSIP Law

(57) ABSTRACT

An optical recording medium is provided, the optical recording medium including a plurality of zones respectively corresponding to width data of first and/or last pulses of an adaptive write pulse waveform stored in a grouping table, the grouping table being configured to group a magnitude of a present mark of input data and magnitudes of leading and/or trailing spaces of the present mark into a short pulse group, a middle pulse group, and a long pulse group using grouping pointers, store data configured to calculate a width of a write pulse, an adaptive write pulse being generated in response to the calculated width, generate the adaptive write pulse waveform by varying a position of a rising edge of a first pulse of a mark to be written according to the magnitudes of the present mark and the leading space, the adaptive write pulse waveform being generated without regard for the trailing space of the present mark being written using the adaptive write pulse waveform, the adaptive write pulse being configured to correspond to the adaptive write pulse waveform, and store rising edge data of the first pulse of the adaptive write pulse waveform varying according to corresponding stored values of lengths of marks to be written. A width of the first pulse is varied by varying the position of the rising edge.

3 Claims, 7 Drawing Sheets

U.S. PATENT DOCUMENTS

| | | |
|---|---|---|
| 5,327,411 A | 7/1994 | Iwasa et al. |
| 5,418,770 A | 5/1995 | Ide et al. |
| 5,490,126 A | 2/1996 | Furumiya et al. |
| 5,499,227 A | 3/1996 | Higasa |
| 5,568,461 A | 10/1996 | Nishiuchi et al. |
| 5,569,517 A | 10/1996 | Tominaga et al. |
| 5,633,844 A | 5/1997 | Maeda et al. |
| 5,636,194 A | 6/1997 | Furumiya et al. |
| 5,642,343 A | 6/1997 | Toda et al. |
| 5,646,928 A | 7/1997 | Wu et al. |
| 5,696,752 A | 12/1997 | Hajjar et al. |
| 5,703,855 A | 12/1997 | Kirino et al. |
| 5,734,637 A | 3/1998 | Ootaki et al. |
| 5,745,467 A | 4/1998 | Sakaue et al. |
| 5,757,735 A | 5/1998 | Fitzpatrick et al. |
| 5,850,378 A | 12/1998 | Ninamino et al. |
| 6,018,508 A | 1/2000 | Hasegawa |
| 6,044,055 A | 3/2000 | Hara |
| 6,115,339 A | 9/2000 | Winarski |
| 6,151,281 A | 11/2000 | Van Der Enden et al. |
| 6,175,541 B1 | 1/2001 | Shoji et al. |
| 6,345,026 B1 | 2/2002 | Furukawa et al. |
| 6,631,110 B1 | 10/2003 | Seo et al. |
| 6,654,325 B1 | 11/2003 | Minemura et al. |
| 7,209,423 B2 | 4/2007 | Seo et al. |
| 7,254,104 B2 * | 8/2007 | Yoshimoto et al. ........ 369/59.25 |
| 7,391,698 B2 | 6/2008 | Seo et al. |
| 7,986,610 B2 * | 7/2011 | Seo et al. .................... 369/275.3 |

FOREIGN PATENT DOCUMENTS

| | | |
|---|---|---|
| EP | 0851413 A2 | 7/1998 |
| JP | 3-22223 | 1/1991 |
| JP | 5-135363 | 6/1993 |
| JP | 6-12674 | 1/1994 |
| JP | 6-295440 | 10/1994 |
| JP | 6-325364 | 11/1994 |
| JP | 7-37250 | 2/1995 |
| JP | 7-121878 | 5/1995 |
| JP | 7-129959 | 5/1995 |
| JP | 7-225947 | 8/1995 |
| JP | 8-7282 | 1/1996 |
| JP | 8-180413 | 7/1996 |
| JP | 8-287465 | 11/1996 |
| JP | 9-81937 | 3/1997 |
| JP | 10-241164 | 9/1998 |
| KR | 10-1993-0000524 | 1/1993 |
| WO | 9815950 | 4/1998 |
| WO | 9828735 A1 | 7/1998 |

OTHER PUBLICATIONS

International Search Report dated Nov. 13, 2008 of the European Patent Application No. 02079350.1.

Office Action issued in Japanese Patent Application No. 2000-319957 on Nov. 4, 2003.

Office Action issued in Japanese Patent Application No. 2002-2741 on Nov. 4, 2003.

Office Action issued in Japanese Patent Application No. 2002-2741 on Apr. 20, 2004.

Office Action issued in Japanese Patent Application No. 2002-2742 on Nov. 4, 2003.

Office Action issued in Japanese Patent Application No. 2002-2742 on Apr. 20, 2004.

Office Action issued in Japanese Patent Application No. 2002-2749 on Nov. 4, 2003.

Office Action issued in Japanese Patent Application No. 2002-2749 on Apr. 20, 2004.

Brazilian Office Action issued Feb. 23, 2011, in counterpart Brazilian Patent Application No. PI9902936-7 (5 pages including partial English translation).

* cited by examiner

FIG. 5

| LEADING SPACE | PRESENT MARK | TRAILING SPACE |
|---|---|---|
| SHORT PULSE | SHORT PULSE | SHORT PULSE |
| SHORT PULSE | SHORT PULSE | MIDDLE PULSE |
| SHORT PULSE | SHORT PULSE | LONG PULSE |
| SHORT PULSE | MIDDLE PULSE | SHORT PULSE |
| SHORT PULSE | MIDDLE PULSE | MIDDLE PULSE |
| SHORT PULSE | MIDDLE PULSE | LONG PULSE |
| SHORT PULSE | LONG PULSE | SHORT PULSE |
| SHORT PULSE | LONG PULSE | MIDDLE PULSE |
| SHORT PULSE | LONG PULSE | LONG PULSE |
| MIDDLE PULSE | SHORT PULSE | SHORT PULSE |
| MIDDLE PULSE | SHORT PULSE | MIDDLE PULSE |
| MIDDLE PULSE | SHORT PULSE | LONG PULSE |
| MIDDLE PULSE | MIDDLE PULSE | SHORT PULSE |
| MIDDLE PULSE | MIDDLE PULSE | MIDDLE PULSE |
| MIDDLE PULSE | MIDDLE PULSE | LONG PULSE |
| MIDDLE PULSE | LONG PULSE | SHORT PULSE |
| MIDDLE PULSE | LONG PULSE | MIDDLE PULSE |
| MIDDLE PULSE | LONG PULSE | LONG PULSE |
| LONG PULSE | SHORT PULSE | SHORT PULSE |
| LONG PULSE | SHORT PULSE | MIDDLE PULSE |
| LONG PULSE | SHORT PULSE | LONG PULSE |
| LONG PULSE | MIDDLE PULSE | SHORT PULSE |
| LONG PULSE | MIDDLE PULSE | MIDDLE PULSE |
| LONG PULSE | MIDDLE PULSE | LONG PULSE |
| LONG PULSE | LONG PULSE | SHORT PULSE |
| LONG PULSE | LONG PULSE | MIDDLE PULSE |
| LONG PULSE | LONG PULSE | LONG PULSE |

FIG. 6

| LEADING SPACE | PRESENT MARK | RISING EDGE SHIFT OF FIRST PULSE(nS) |
|---|---|---|
| SHORT PULSE | SHORT PULSE | +1 |
| SHORT PULSE | MIDDLE PULSE | −1 |
| SHORT PULSE | LONG PULSE | −3 |
| MIDDLE PULSE | SHORT PULSE | +2 |
| MIDDLE PULSE | MIDDLE PULSE | 0 |
| MIDDLE PULSE | LONG PULSE | −2 |
| LONG PULSE | SHORT PULSE | −3 |
| LONG PULSE | MIDDLE PULSE | −1 |
| LONG PULSE | LONG PULSE | 0 |

FIG. 7

| PRESENT MARK | TRAILING SPACE | FALLING EDGE SHIFT OF LAST PULSE(nS) |
|---|---|---|
| SHORT PULSE | SHORT PULSE | +1 |
| MIDDLE PULSE | SHORT PULSE | +2 |
| LONG PULSE | SHORT PULSE | +4 |
| SHORT PULSE | MIDDLE PULSE | −1 |
| MIDDLE PULSE | MIDDLE PULSE | 0 |
| LONG PULSE | MIDDLE PULSE | +1 |
| SHORT PULSE | LONG PULSE | −3 |
| MIDDLE PULSE | LONG PULSE | −1 |
| LONG PULSE | LONG PULSE | 0 |

ADAPTIVE WRITING METHOD FOR HIGH-DENSITY OPTICAL RECORDING APPARATUS AND CIRCUIT THEREOF

CROSS-REFERENCE TO RELATED APPLICATIONS

This application is a continuation of application Ser. No. 12/122,912, filed on May 19, 2008, which is a continuation of application Ser. No. 11/432,473, filed on May 12, 2006, now U.S. Pat. No. 7,391,698, which is a continuation of application Ser. No. 10/774,404, filed Feb. 10, 2004, now U.S. Pat. No. 7,209,423, which is a continuation of application Ser. No. 09/609,822, filed Jul. 3, 2000, now U.S. Pat. No. 7,158,461, which is a divisional of application Ser. No. 09/359,128, filed Jul. 23, 1999, now U.S. Pat. No. 6,631,110 and claims the benefit of Korean Patent Application No. 98-29732, filed Jul. 23, 1998, in the Korean Industrial Patent Office, the entire disclosures of which are incorporated herein by reference for all purposes.

BACKGROUND

1. Field of the Invention

The following description relates to an adaptive writing method for a high-density optical recording apparatus and a circuit thereof, and more particularly, to an adaptive writing method for optimizing light power of a light source, e.g., a laser diode, to be suitable to characteristics of a recording apparatus, and a circuit thereof.

2. Description of the Related Art

With the multi-media era requiring high-capacity recording media, optical recording systems employing high-capacity recording media, such as a magnetic optical disc drive (MODD) or a digital versatile disc random access memory (DVD-RAM) drive, have been widely used.

As the recoding density increases, such optical recording systems require optimal and high-precision states. In general, with an increase in recording density, temporal fluctuation (to be referred to as jitter, hereinafter) in a data domain increases. Thus, in order to attain high-density recording, it is very important to minimize the jitter.

Conventionally, a write pulse is formed as specified in the DVD-RAM format book shown in FIG. 1B, with respect to input NRZI (Non-Return to Zero Inversion) data having marks of 3T, 5T and 11T (T being the channel clock duration), as shown in FIG. 1A. Here, the NRZI data is divided into mark and space. The spaces are in an erase power level for overwriting. The waveform of a write pulse for marks equal to or longer than 3T mark, that is, 3T, 4T, . . . 11T and 14T is comprised of a first pulse, a last pulse and a multi-pulse train. Here, only the number of pulses in the multi-pulse train is varied depending on the magnitude of a mark.

In other words, the waveform of the write pulse is comprised of a combination of read power (FIG. 1C), peak power or write power (FIG. 1D) and bias power or erase power (FIG. 1E). Here, the respective power signals shown in FIGS. 1C, 1D and 1E are all low-active signals.

The waveform of the write pulse is the same as that in accordance with the first generation 2.6 GB DVD-RAM standard. In other words, in accordance with the 2.6 GB DVD-RAM standard, the waveform of the write pulse is comprised of a first pulse, a multi-pulse train and a last pulse. Although the rising edge of the first pulse or the falling edge of the last pulse can be read from a lead-in area to be used, adaptive writing is not possible since the write pulse is fixed to be constant.

Therefore, when a write operation is performed by forming such a write pulse as shown in FIG. 1B, severe thermal interference may occur back and forth with respect to a mark in accordance with input NRZI data. In other words, when a mark is long and a space is short or vice versa, jitter is most severe. This is a major cause of lowered system performance. Also, this does not make it possible for the system to be applied to high-density DVD-RAMs, e.g., second generation 4.7 GB DVD-RAMs.

SUMMARY

In one general aspect, there is provided an optical recording medium, including a plurality of zones respectively corresponding to width data of first and/or last pulses of an adaptive write pulse waveform stored in a grouping table, the grouping table being configured to group a magnitude of a present mark of input data and magnitudes of leading and/or trailing spaces of the present mark into a short pulse group, a middle pulse group, and a long pulse group using grouping pointers, store data configured to calculate a width of a write pulse, an adaptive write pulse being generated in response to the calculated width, generate the adaptive write pulse waveform by varying a position of a rising edge of a first pulse of a mark to be written according to the magnitudes of the present mark and the leading space, the adaptive write pulse waveform being generated without regard for the trailing space of the present mark being written using the adaptive write pulse waveform, the adaptive write pulse being configured to correspond to the adaptive write pulse waveform, and store rising edge data of the first pulse of the adaptive write pulse waveform varying according to corresponding stored values of lengths of marks to be written. A width of the first pulse is varied by varying the position of the rising edge.

The general aspect of the medium may further provide that the grouping table is further configured to store the rising edge data of the first pulse for the adaptive write pulse waveform according to corresponding stored values of lengths of marks to be written, and store the leading space grouped according to a first preset length of the mark and space and a second preset length of the mark and space.

In another general aspect, there is provided an optical recording medium, including a plurality of zones respectively corresponding to width data of first and/or last pulses of an adaptive write pulse waveform stored in a grouping table, the grouping table having width data grouped into a short pulse group, a middle pulse group, and a long pulse group using grouping pointers, the pulse groups being configured to group first and last pulses of a write pulse waveform by corresponding lengths of a present mark of input data and a leading space of the present mark to generate the adaptive write pulse waveform by varying a position of a rising edge of the first pulse of a mark to be written according to the length of at least the present mark and/or the leading space, the grouping table being configured to store data configured to calculate a width of a write pulse, an adaptive write pulse being generated in response to the calculated width and configured to correspond to the adaptive write pulse waveform, and store rising edge data of the first pulse of the write pulse waveform grouped in corresponding pulse groups according to lengths of marks to be written and lengths of spaces adjacent to the marks to be written. The width of the first pulse is varied by varying the position of the rising edge.

In another general aspect, there is provided an optical recording medium, including a plurality of zones respectively corresponding to width data of first and/or last pulses of an adaptive write pulse waveform stored in a grouping table, the grouping table having width data grouped into a short pulse group, a middle pulse group, and a long pulse group using grouping pointers, the pulse groups being configured to group first and last pulses of a write pulse waveform by corresponding lengths of a present mark of input data and a leading space of the present mark, the grouping table being configured to store data configured to calculate a width of a write pulse, an adaptive write pulse being generated in response to the calculated width and configured to correspond to the adaptive write pulse waveform, generate the adaptive write pulse waveform by varying a position of a rising edge of a first pulse of the mark to be written according to a length of at least the present mark and the leading space, and store rising edge data of the first pulse of the write pulse waveform grouped in corresponding ones of the pulse groups according to lengths of marks to be written and lengths of spaces adjacent to the marks to be written. The width of the first pulse is varied by varying the position of the rising edge.

Other features and aspects may be apparent from the following detailed description, the drawings, and the claims.

BRIEF DESCRIPTION OF THE DRAWINGS

FIG. 5 is a table illustrating an example of the combination of pulses generated by the grouping shown in FIG. 4.

FIG. 6 is a table illustrating an example of rising edge shift values of a first pulse.

FIG. 7 is a table illustrating an example of falling edge shift values of a last pulse.

Figure 1:
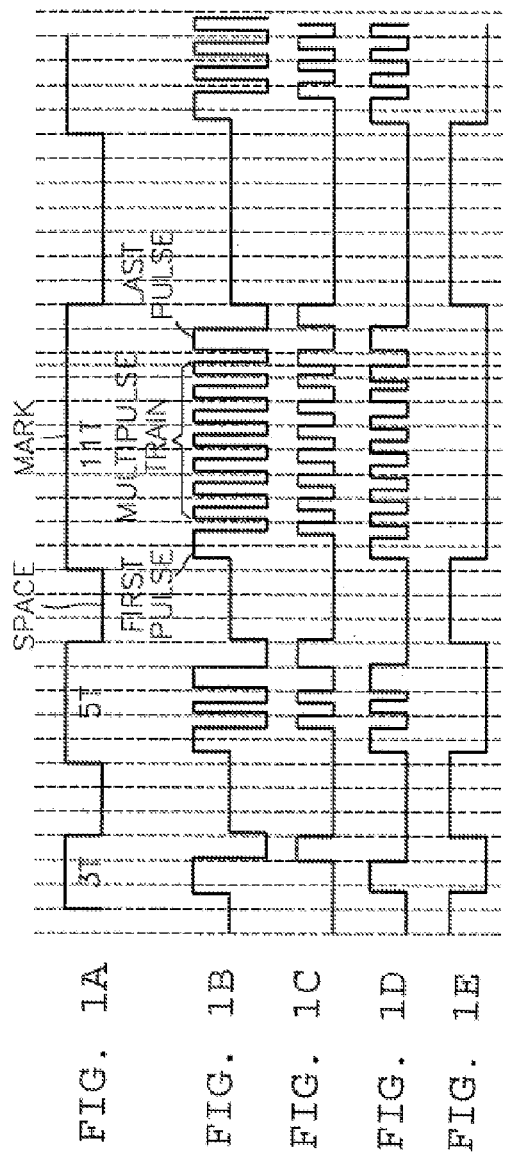
FIGS. 1A through 1E are waveform diagrams illustrating examples of conventional write pulses.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
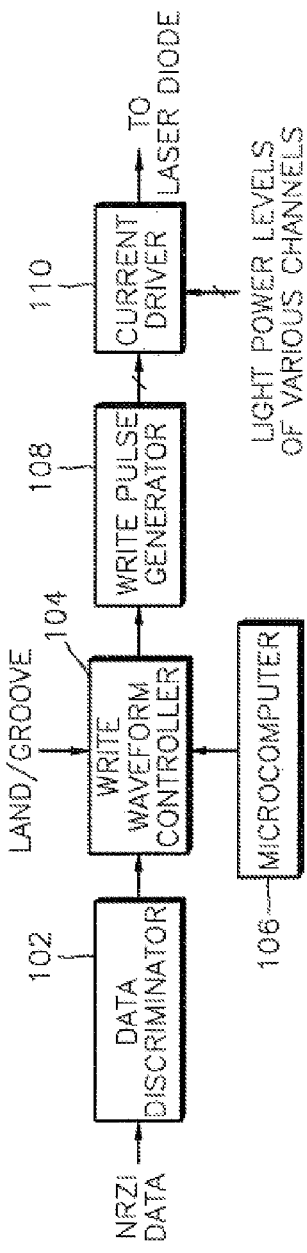
FIG. 2 is a block diagram illustrating an example of an adaptive writing circuit for a high-density optical recording apparatus.
Figure 3:
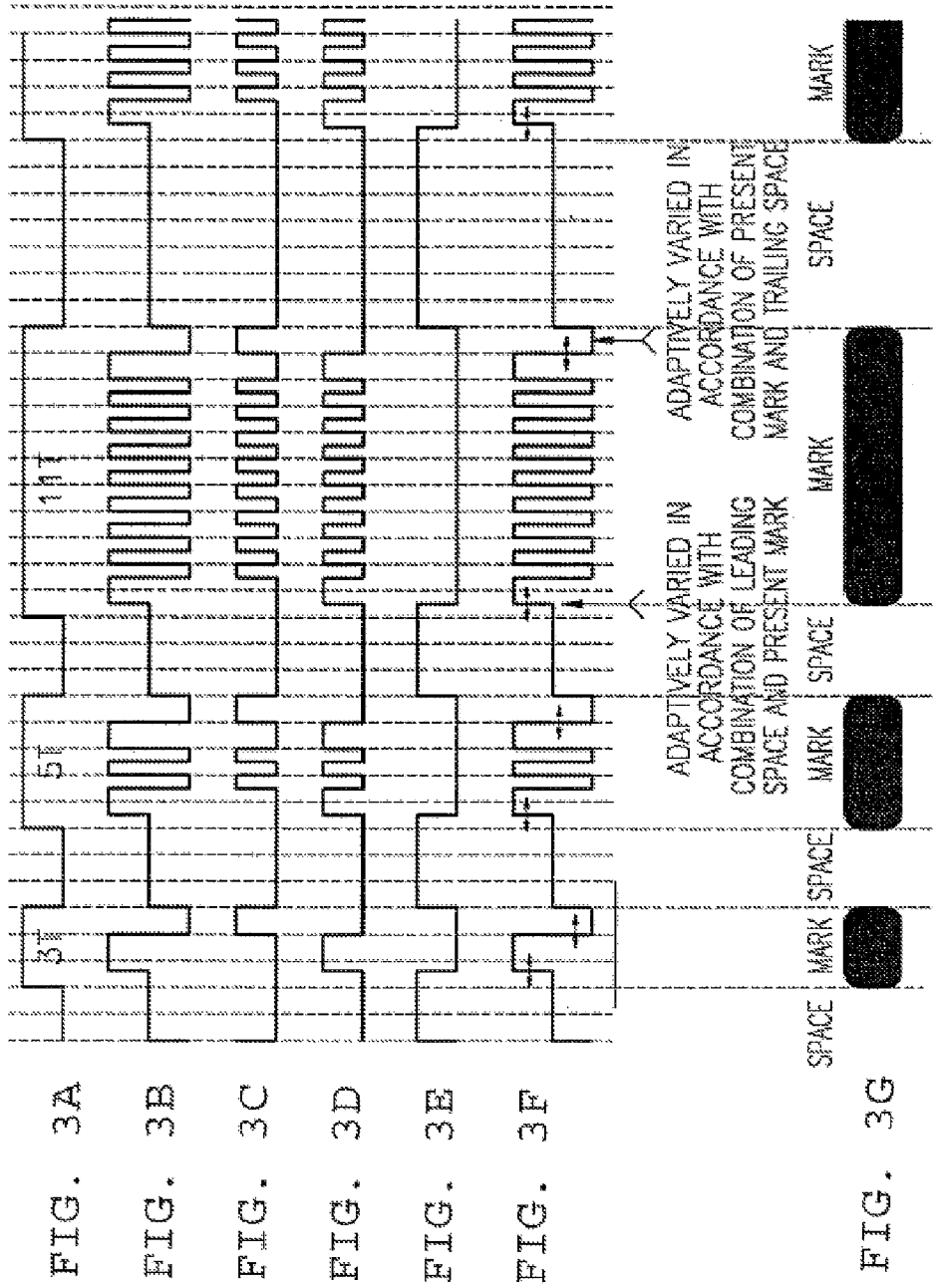
FIGS. 3A through 3G are waveform diagrams illustrating examples of an adaptive write pulse recorded by the adaptive writing circuit shown in FIG. 2.

An adaptive writing circuit, as shown in FIG. 2, includes a data discriminator 102, a write waveform controller 104, a microcomputer 106, a write pulse generator 108 and a current driver 110. In other words, the data discriminator 102 discriminates input NRZI data. The write waveform controller 104 corrects the waveform of a write pulse in accordance with the discrimination result of the data discriminator 102 and land/groove signal. The microcomputer 106 initializes the write waveform controller 104 or controls the data stored in the write waveform controller 104 to be updated in accordance with write conditions. The write pulse generator 108 generates an adaptive write pulse in accordance with the output of the write waveform controller 104. The current driver 110 converts the adaptive write pulse generated from the write pulse generator 108 into a current signal in accordance with the light power levels of the respective channels to drive a light source.

Next, the operation of the apparatus shown in FIG. 2 will be described with reference to FIGS. 3 through 7.

In FIG. 2, the data discriminator 102 discriminates the magnitude of a mark corresponding to the present write pulse (to be referred to as a present mark), the magnitude of the front-part space corresponding to the first pulse of the present mark (to be referred to as a leading space, hereinafter) and the magnitude of the rear-part space corresponding to the last pulse of the present mark (to be referred to as a trailing space) from input NRZI data, and applies the magnitudes of the leading and trailing spaces and the magnitude of the present mark to the write waveform controller 104.

Here, the magnitudes of the leading and trailing spaces and the magnitude of the present mark may range from 3T to 14T. There can be more than 1,000 possible combinations. Thus, circuits or memories for obtaining the amounts of shift in rising edges of the first pulses and falling edges of the last pulses are necessary with respect to all cases, which complicates the system and hardware. Therefore, the magnitudes of the present mark and the leading and trailing spaces of input NRZI data are grouped into a short pulse group, a middle pulse group and a long pulse group and the grouped magnitudes of the present mark and the leading and trailing spaces are used.

The write waveform controller 104 shifts the rising edge of the first pulse back and forth in accordance with the magnitudes of the leading space and the present mark, supplied from the data discriminator 102, or shifts the falling edge of the last pulse back and forth in accordance with the magnitudes of the present mark and the trailing space, to thus form a write waveform having an optimal light power. Here, the multi-pulse train of a mark takes the same shape as shown in FIG. 3B, that is, 0.5 T.

Also, the write waveform controller 104 can correct the rising edge of the first pulse of the present mark and the falling edge of the last pulse of the present mark into different values in accordance with externally applied land/groove signals (LAND/GROOVE) indicating whether the input NRZI data is in a land track or a groove track. This is for forming a write waveform in consideration of different optimal light powers depending on the land and groove. A difference of 1-2 mW in the optimal light powers between the land and the groove, and may be specifically set or managed by the specifications.

Therefore, the write waveform controller 104 may be constituted by a memory in which data corresponding to a shift value of the rising edge of the first pulse and a shift value of the falling edge of the last pulse in accordance with the magnitude of the present mark of input NRZI data and the magnitudes of the leading and trailing spaces thereof, is stored, or a logic circuit. In the case that the write waveform controller 104 is constituted by a memory, the widths of the first pulse and the last pulse are determined as channel clocks (T) plus and minus a data value (shift value) stored in the memory. Also, in this memory, shift values of the first and last pulses of the mark for each of a land and a groove may be stored. A table in which the shift value of the rising edge of the first pulse is stored and a table in which the shift value of the falling edge of the last pulse is stored may be incorporated. Alternatively, as shown in FIGS. 6 and 7, two separate tables may be prepared.

A microcomputer 106 initializes the write waveform controller 104 or controls the shift values of the first and/or last pulse(s) to be updated in accordance with recording conditions. In particular, in accordance with zones, the light power can vary or the shift values of the first and last pulses can be reset.

The pulse width data for controlling the waveform of the write pulse is provided to the write pulse generator 108. The write pulse generator 108 generates an adaptive write pulse, as shown in FIG. 3F, in accordance with the pulse width data for controlling the waveform of the write pulse supplied from the write waveform controller 104 and supplies control signals shown in FIGS. 3C, 3D and 3E, for controlling the current flow for the respective channels (i.e., read, peak and bias channels) for the adaptive write pulse, to the current driver 110.

The current driver 110 converts the driving level of the light power of the respective channels (i.e., read, peak and bias channels) into current for a control time corresponding to the control signal for controlling the current flow of the respective channels to allow the current to flow through the laser diode so that an appropriate amount of heat is applied to the recording medium by continuous ON-OFF operations of the laser diode or a change in the amounts of light. Here, a record domain as shown in FIG. 3G is formed on the recording medium.

FIG. 3A shows input NRZI data, which is divided into mark and space. FIG. 3B shows a basic write waveform, in which the rising edge of the first pulse of the write pulse lags behind by 0.5T, compared to the rising edge of the present mark. FIG. 3C shows the waveform of a read power of the adaptive write pulse, FIG. 3D shows the waveform of a peak power of the adaptive write pulse, and FIG. 3E shows the waveform of a bias power of the adaptive write pulse. FIG. 3F shows the waveform of the adaptive write pulse. The rising edge of the first pulse of the write waveform of the adaptive write pulse may be shifted back and forth in accordance with a combination of the magnitude of the leading space and the magnitude of the present mark. An arbitrary power (here, a read power or a write power) is applied during the period corresponding to the shift. Likewise, the falling edge of the last pulse of the adaptive write pulse may be shifted back and forth in accordance with a combination of the magnitude of the present mark and the magnitude of the trailing space. Also, an arbitrary power (here, a read power or a write power) is applied during the period corresponding to the shift.

Alternatively, the falling edge of the last pulse may be shifted back and forth in accordance with the magnitude of the present mark, regardless of the magnitude of the trailing space of the present mark.

Also, rather than shifting the rising edge of the first pulse and the falling edge of the last pulse, the edge of any one pulse may be shifted. Also, in view of the direction of shift, shifting may be performed back and forth, only forward or only backward.

Figure 4:
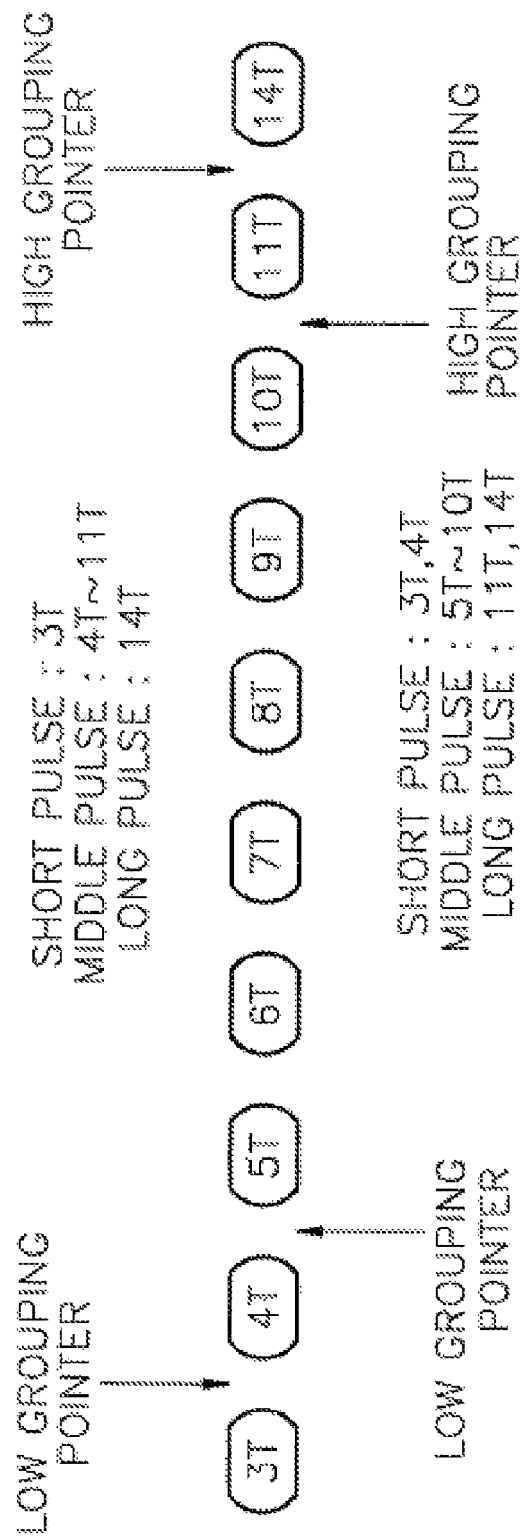
FIG. 4 illustrates examples of grouping of input data.

FIG. 4 illustrates grouping of input NRZI data, showing two examples of grouping. In the first example, if a low grouping pointer is 3 and a high grouping pointer is 12, then the mark of a short pulse group is 3T, the marks of a middle pulse group are from 4T to 11T and the mark of a long pulse group is 14T. In the second example, if a low grouping pointer is 4 and a high grouping pointer is 11, then the marks of a short pulse group are 3T and 4T, the marks of a middle pulse group are from 5T to 10T and the marks of a long pulse group are 11T and 14T. As described above, since both the low grouping pointer and the high grouping pointer are used, utility efficiency is enhanced. Also, grouping can be performed differently for the respective zones.

FIG. 5 illustrates the number of cases depending on combinations of leading and trailing spaces and present marks, in the case of classifying input NRZI data into three groups, as shown in FIG. 4, using grouping pointers. FIG. 6 illustrates a table showing shift values of rising edges of the first pulse depending on the magnitude of the leading space and the magnitude of the present mark. FIG. 7 illustrates a table showing shift values of falling edges of the last pulse depending on the magnitude of the present mark and the magnitude of the trailing space.

Figure 8:
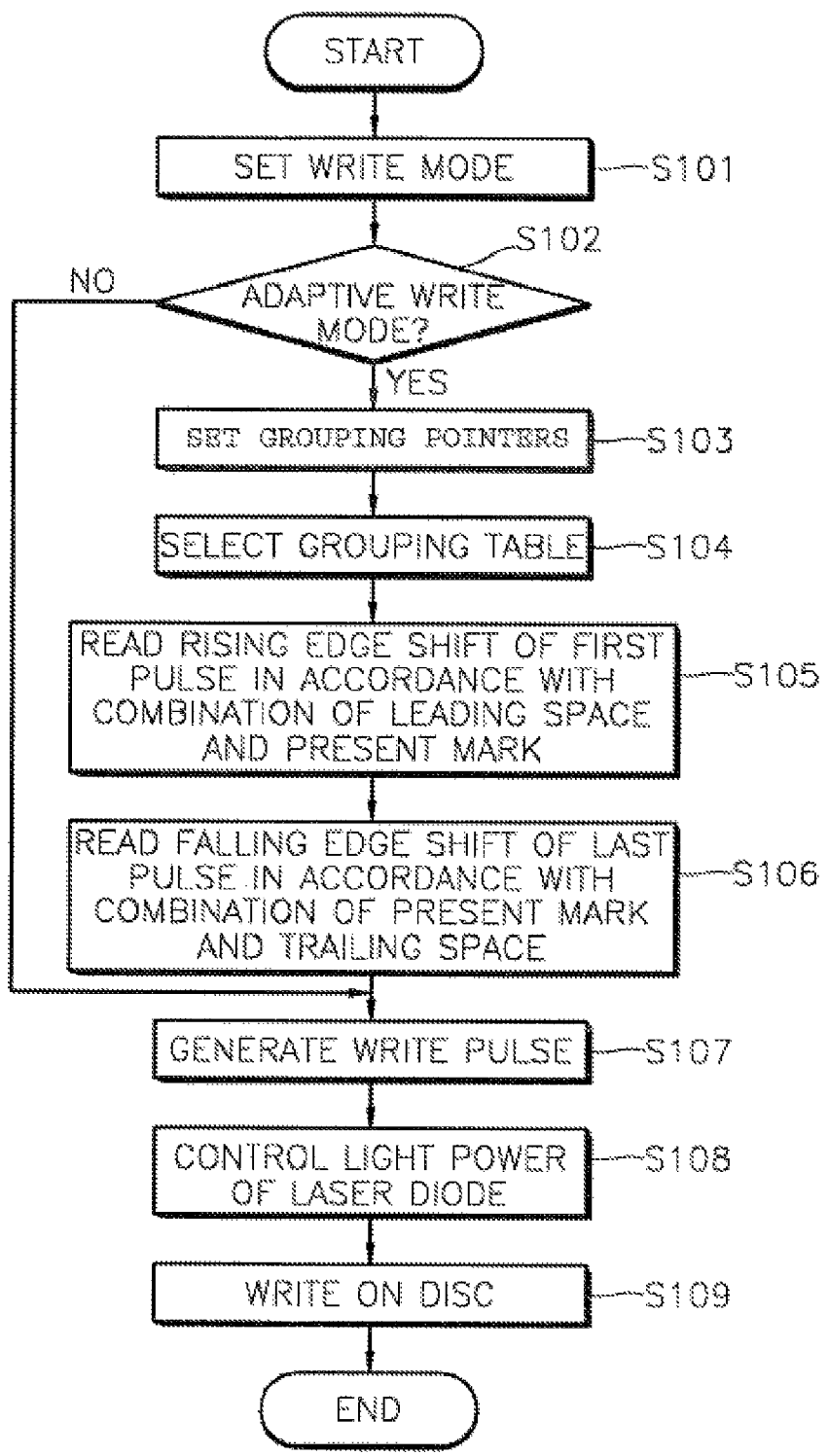
FIG. 8 is a flowchart of an example of an adaptive writing method.

FIG. 8 is a flow chart illustrating an embodiment of an adaptive writing method. First, a write mode is set (step S101). If the write mode is set, it is determined whether it is an adaptive writing mode or not (step S102). If it is determined in step S102 that the write mode is an adaptive write mode, a grouping pointer is set (step S103). Then, a grouping table depending on the set grouping pointer is selected (step S104). The selected grouping table may be a table reflecting land/groove as well as the grouping pointer. Also, the selected grouping table may be a table reflecting zones of the recording medium.

Shift values of the rising edge of the first pulse are read from the table shown in FIG. 6 in accordance with a combination of the present mark and the leading space (step S105), and shift values of the falling edge of the last pulse are read from the table shown in FIG. 7 in accordance with a combination of the present mark and the trailing space (step S106).

The adaptive write pulse in which the first pulse and the last pulse are controlled in accordance with the read shift value is generated (step S107). Then, the light powers of the respective channels for the generated adaptive write pulse, i.e., read, peak and bias powers, are controlled to drive a laser diode (step S108) to then perform a write operation on a disc (step S109). If the write mode is not an adaptive write mode, a general write pulse is generated in step S107.

Figure 9:
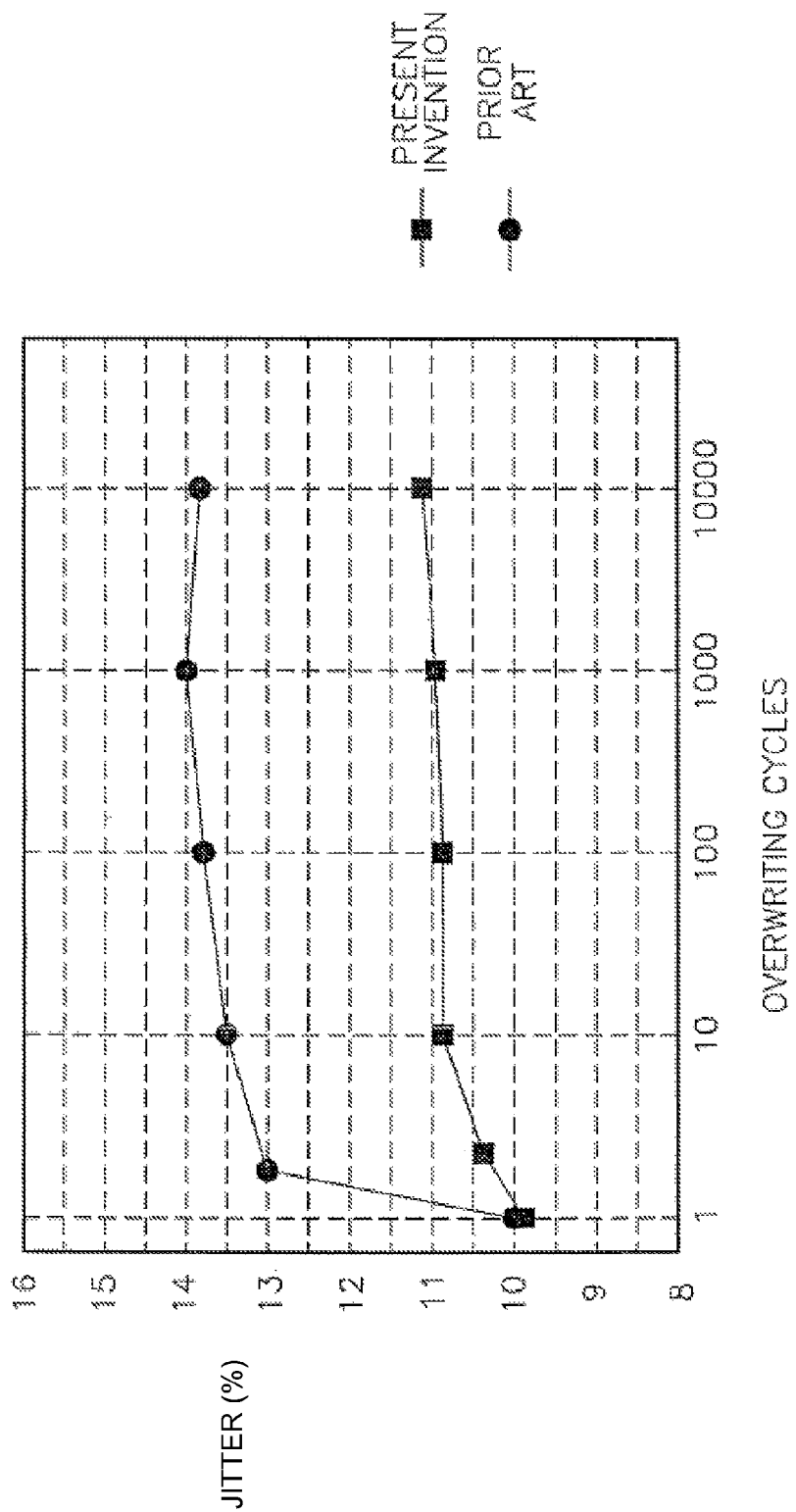
FIG. 9 is a graph of an example for comparing jitter generated by the adaptive writing method of FIG. 8 and the conventional writing method.

FIG. 9 is a graph for comparing jitter generated by the adaptive writing method according to FIG. 8 and the conventional writing method. It is understood that, assuming that the peak light is 9.5 mW, the bottom power of a multi-pulse train is 1.2 mW, the cooling power is 1.2 mW and the bias power is 5.2 mW, there is less jitter generated when writing the adaptive write pulse according to FIG. 8 than when generated writing the fixed write pulse according to the conventional writing method. The initialization conditions are a speed of 4.2 m/s, an erase power of 7.2 mW and 100 write operations.

In other words, according to the examples described above, in adaptively varying the marks of a write pulse, the rising edge of the first pulse is adaptively shifted in accordance with the magnitude of the leading space and the magnitude of the present mark of input NRZI data to thus control the waveform of the write pulse, and/or the falling edge of the last pulse is adaptively shifted in accordance with the magnitude of the present mark and the magnitude of the trailing space of input NRZI data to thus control the waveform of the write pulse, thereby minimizing jitter. Also, the waveform of the write pulse may be optimized in accordance with land/groove signals. Also, in the examples described above, grouping may be performed differently for the respective zones, using grouping pointers.

A new adaptive writing method according to the examples described above can be adopted to most high-density optical recording apparatuses using an adaptive writing pulse.

As described above, the widths of the first and/or last pulses of a write pulse waveform are varied in accordance with the magnitude of the present mark of input NRZI data and the magnitude of the leading or trailing space, thereby minimizing jitter to enhance system reliability and performance. Also, the width of a write pulse is controlled by grouping the magnitude of the present mark and the magnitude of the leading or trailing spaces, thereby reducing the size of a hardware.

According to the examples described above, an adaptive writing method of a write pulse generated in accordance with the magnitude of the present mark of input data and the magnitudes of the leading and/or trailing spaces thereof may be provided. Further, according to the examples described above, an adaptive writing circuit for a high-density optical recording apparatus may be provided for optimizing light power of a laser diode by generating an adaptive write pulse in accordance with the magnitude of the present mark of input data and the magnitudes of the leading and trailing spaces thereof.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical recording medium, comprising:
    a data area comprising a plurality of zones; and
    a grouping table configured to store data configured to calculate a width of a write pulse, and information on a position of a rising edge data of a first pulse of an adaptive write pulse waveform based on a combination of a mark pulse group corresponding to a magnitude of a present mark to be written and a space pulse group corresponding to a magnitude of a leading space of the present mark.

2. The optical recording medium of claim 1, wherein the grouping table is further configured to:
    store the rising edge data of the first pulse for the adaptive write pulse waveform according to corresponding stored values of lengths of marks to be written; and
    store the leading space grouped according to a first preset length of the mark and space and a second preset length of the mark and space.

3. An apparatus configured to write input data on an optical recording medium comprising a data area and a grouping table, the grouping table comprising information on a position of a rising edge of a first pulse based on a combination of a mark pulse group and a space pulse group, the apparatus comprising:
    a discriminator configured to discriminate the mark pulse group corresponding to a magnitude of a present mark to be written, and the space pulse group corresponding to a magnitude of a leading space of the present mark;
    a write waveform controller configured to select the information on the position of the rising edge of the first pulse from the grouping table based on the discriminated mark pulse group and the discriminated space pulse group, and generate an adaptive write pulse waveform based on the selected information on the position of the rising edge of the first pulse; and
    a processor configured to process the input data on the optical recording medium based on the adaptive write pulse waveform.

* * * * *